(12) United States Patent
Sukhman et al.

(10) Patent No.: US 9,694,448 B2
(45) Date of Patent: Jul. 4, 2017

(54) METHODS AND SYSTEMS FOR OPERATING LASER PROCESSING SYSTEMS

(75) Inventors: Yefim P. Sukhman, Scottsdale, AZ (US); Michael L. Flanary, Scottsdale, AZ (US); Stefano J. Noto, Mesa, AZ (US); Christian J. Risser, Scottsdale, AZ (US); Miesha T. Stoute, Laveen, AZ (US); David John Zirbel, Jr., Cave Creek, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 861 days.

(21) Appl. No.: 13/470,157

(22) Filed: May 11, 2012

(65) Prior Publication Data
US 2013/0299465 A1    Nov. 14, 2013

(51) Int. Cl.
*B23K 26/00* (2014.01)
*B23K 37/00* (2006.01)
*B23K 26/70* (2014.01)

(52) U.S. Cl.
CPC .............. *B23K 37/00* (2013.01); *B23K 26/00* (2013.01); *B23K 26/702* (2015.10)

(58) Field of Classification Search
CPC .......... B23K 3/00; B23K 26/00; B23K 26/02; B23K 26/10; H05S 3/13; H05S 3/00; H05S 5/00
USPC ............... 219/85.12, 121.6, 121.61–121.69, 219/121.76–121.83; 372/29.012, 29.02, 372/29.021, 38.02, 50.12; 700/166
See application file for complete search history.

(56) References Cited

U.S. PATENT DOCUMENTS

| | | | |
|---|---|---|---|
| 6,149,643 A | 11/2000 | Herekar et al. | |
| 6,534,705 B2 * | 3/2003 | Berrios et al. | 136/243 |
| 6,792,259 B1 * | 9/2004 | Parise | 455/343.1 |
| 6,920,163 B2 | 7/2005 | Ishii et al. | |
| 7,068,991 B2 * | 6/2006 | Parise | 455/343.1 |
| 7,724,790 B2 * | 5/2010 | Teramura | 372/29.015 |
| 8,058,609 B2 * | 11/2011 | Hyde et al. | 250/227.26 |
| 8,552,597 B2 * | 10/2013 | Song et al. | 307/149 |
| 8,615,672 B2 * | 12/2013 | Henry et al. | 713/340 |
| 8,803,053 B2 * | 8/2014 | Hyde et al. | 250/201.1 |
| 2004/0186609 A1 * | 9/2004 | Patel et al. | 700/121 |
| 2005/0127680 A1 * | 6/2005 | Lof et al. | 290/44 |
| 2005/0226288 A1 * | 10/2005 | Ryan et al. | 372/29.02 |
| 2006/0264918 A1 | 11/2006 | Cook et al. | |
| 2007/0230520 A1 * | 10/2007 | Mordaunt | A61F 9/008 372/23 |
| 2008/0182655 A1 | 7/2008 | DeWaal et al. | |
| 2009/0099700 A1 * | 4/2009 | Taravat et al. | 700/282 |
| 2010/0079009 A1 * | 4/2010 | Hyde et al. | 307/149 |
| 2011/0073525 A1 * | 3/2011 | Evans | 208/157 |
| 2012/0233062 A1 * | 9/2012 | Cornish | 705/39 |

* cited by examiner

*Primary Examiner* — Michael LaFlame, Jr.
(74) *Attorney, Agent, or Firm* — Perkins Coie LLP (57) ABSTRACT

Embodiments of methods and systems for distributing laser energy are disclosed herein. A method configured in accordance with one embodiment includes establishing communication with a laser energy source configured to dispense laser energy, and enabling the laser energy source to dispense laser energy by transferring laser energy credits to the laser energy source. The transferred laser energy credits correspond to an amount of enabled laser energy.

22 Claims, 6 Drawing Sheets

METHODS AND SYSTEMS FOR OPERATING LASER PROCESSING SYSTEMS

TECHNICAL FIELD

The present disclosure is directed generally to distribution of laser energy by enabling local devices such as laser sources or laser processing systems to dispense laser energy.

BACKGROUND

Lasers are being used in various applications. For example, laser processing systems are being adopted in manufacturing for material processing at an ever increasing rate. Laser processing systems offer many advantages over more conventional processing applications. For example, laser processing systems are particularly suited for cutting shapes or profiles out of materials, marking or preparing materials by removing or modifying surface layers of materials, and welding or sintering materials because they offer the advantage of providing non-contact, tool-less, and fixture-less methods of processing materials. In many cases, laser processing systems are replacing processes that require investments in tooling such as dies for die cutting, masks for silk screening, or templates and fixtures for hard tooling.

BRIEF DESCRIPTION OF THE DRAWINGS

FIGS. 3A-5B are schematic illustrations representing several methods, policies, or models for requesting and dispensing laser energy credits.

DETAILED DESCRIPTION

The following disclosure describes various embodiments of systems and methods for dispensing laser energy from devices, such as laser processing systems or laser energy sources (e.g., a single laser, multiple lasers, a laser system, a cluster of laser systems, etc.). In one embodiment, for example, a company, enterprise, facility, environment, system, provider or other suitable entity is configured to communicate with a laser processing system or consumer for the purpose of distributing laser energy credits corresponding to an amount of laser energy dispensed, or predicted to be dispensed, by the laser processing system. For example, the company or enterprise can sell or provide a laser system to a consumer without charging up front for a laser energy source associated with the laser processing system. Rather, the company or enterprise provides the consumer and/or laser processing system with a mechanism for metering laser energy used by the laser energy source and charging for consumption of the laser energy used by the laser source. Additional embodiments of the disclosure are further directed to purchasing, selling, and distributing laser energy credits corresponding to measured amounts of laser energy that can be purchased and transferred via a secure computerized commerce system. The laser energy credits are configured to enable a laser energy source of a laser processing system to emit or dispense a corresponding amount of laser energy for material processing.

Certain details are set forth in the following description and in FIGS. 1-6 to provide a thorough understanding of various embodiments of the disclosure. Other details describing well-known structures and systems often associated with laser processing systems and/or communication and methods for operating and using such systems are not set forth in the following disclosure to avoid unnecessarily obscuring the description of the various embodiments of the disclosure.

Many of the details, dimensions, angles and/or other portions shown in the Figures are merely illustrative of particular embodiments of the disclosure and may be schematically illustrated. As such, the schematic illustration of the features shown in the Figures is not intended to limit any structural features or configurations of the processing systems disclosed herein. Accordingly, other embodiments can have other details, dimensions, angles and/or portions without departing from the spirit or scope of the present disclosure. In addition, further embodiments of the disclosure may be practiced without several of the details described below, while still other embodiments of the disclosure may be practiced with additional details and/or portions.

Figure 1:
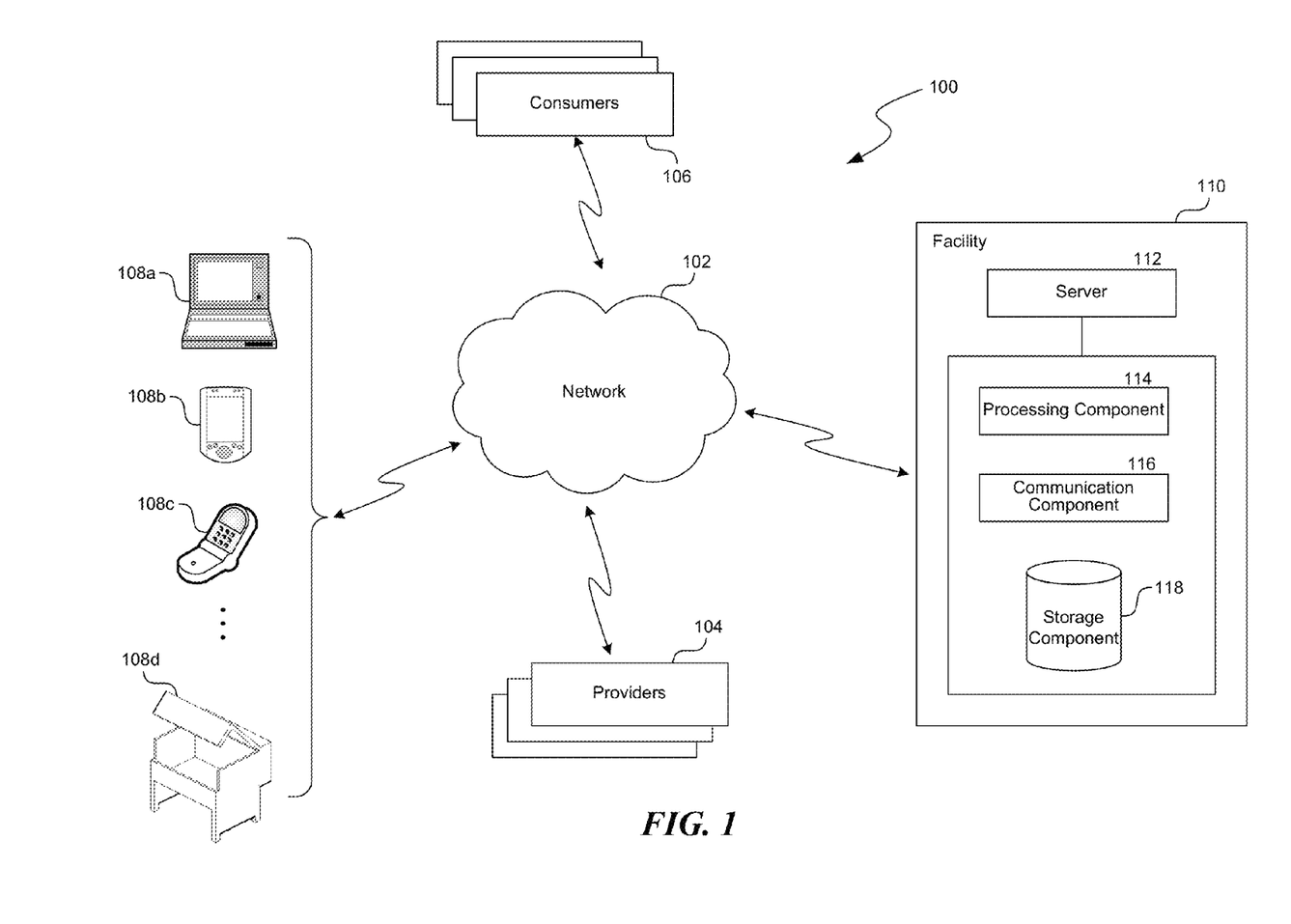
FIGS. 1 and 2 are schematic diagrams of suitable computing environments for distributing laser energy credits associated with laser processing systems in accordance with embodiments of the disclosure.

FIG. 1 is a schematic diagram of a suitable computing environment 100 for communicating with and distributing laser energy credits to consumers or laser processing systems. Although not required, aspects and implementations of the disclosure are described in the general context of computer-executable instructions, such as routines executed by a general-purpose computer, e.g., a server or personal computer. Those of ordinary skill in the art will appreciate that aspects of the disclosure can be practiced with other computer system configurations, including Internet appliances, set-top boxes, hand-held devices, wearable computers, tablet computers, mobile phones, multiprocessor systems, microprocessor-based systems, minicomputers, mainframe computers, programmable logic controllers, or the like. Aspects of the disclosure can be embodied in a special purpose computer or data processor that is specifically programmed, configured, or constructed to perform one or more of the computer-executable instructions explained in detail below. Indeed, the terms "computer" or "controller" as used generally herein, refers to any of the above devices as well as any data processor or any device capable of communicating with a network, including consumer electronic goods such as entertainment devices, cameras, or other electronics having a data processor and other components, e.g., network communication circuitry. Data processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium or non-transitory medium for data. Software may include one or more program modules which include routines, programs, objects, components, data structures, and so on that perform particular tasks or implement particular abstract data types.

Aspects of the disclosure can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or subroutines may be located in both local and remote memory storage devices. Aspects of the disclosure described herein may be stored or distributed on tangible, non-transitory computer-readable media, including magnetic and optically readable and removable computer discs, stored in firmware in chips (e.g., EEPROM chips). Alternatively, aspects of the disclosure may be distributed electronically over the Internet or over other networks (including wireless networks). Those of ordinary skill in the art will recognize that portions of the disclosure may reside on a server computer, while corresponding portions reside on a client computer. Data structures and transmission of data particular to aspects of the disclosure are also encompassed within the scope of the disclosure.

Referring to FIG. 1, the environment 100 includes a facility 110 that is configured to distribute laser energy credits from a provider 104 to a consumer 106 over a network 102, such as the Internet, intranet, or other network. One of ordinary skill in the art will appreciate that the term "consumer" is not limited to a single person or entity, but rather can include one or more systems, entities, networked processing systems, etc. as described in detail below. Consumers 106 are able to request, pay for, and/or receive the laser energy credits using any suitable computing device 108 (identified individually as first through fourth computing devices 108a-108d). To evaluate requests for laser energy credits and transfer laser energy credits over the network 102, the facility 100 can be comprised of one or more computing devices or servers 112 associated with a processing component 114, communication component 116, and storage component 118. Although only a single server, 112, processing component 114, communication component 116, and storage component 118 are illustrated in FIG. 1, one of ordinary skill in the art will appreciate that the facility 110 can include multiple such components. Moreover, one of ordinary skill in the art will appreciate that the processing component 114, as well as the processing components, computing components, and/or servers described below can be special purpose computers or data processors that can be specifically programmed, configured, or otherwise constructed to perform and/or store one or more of the computer- executable instructions as further explained in detail below.

Figure 2:
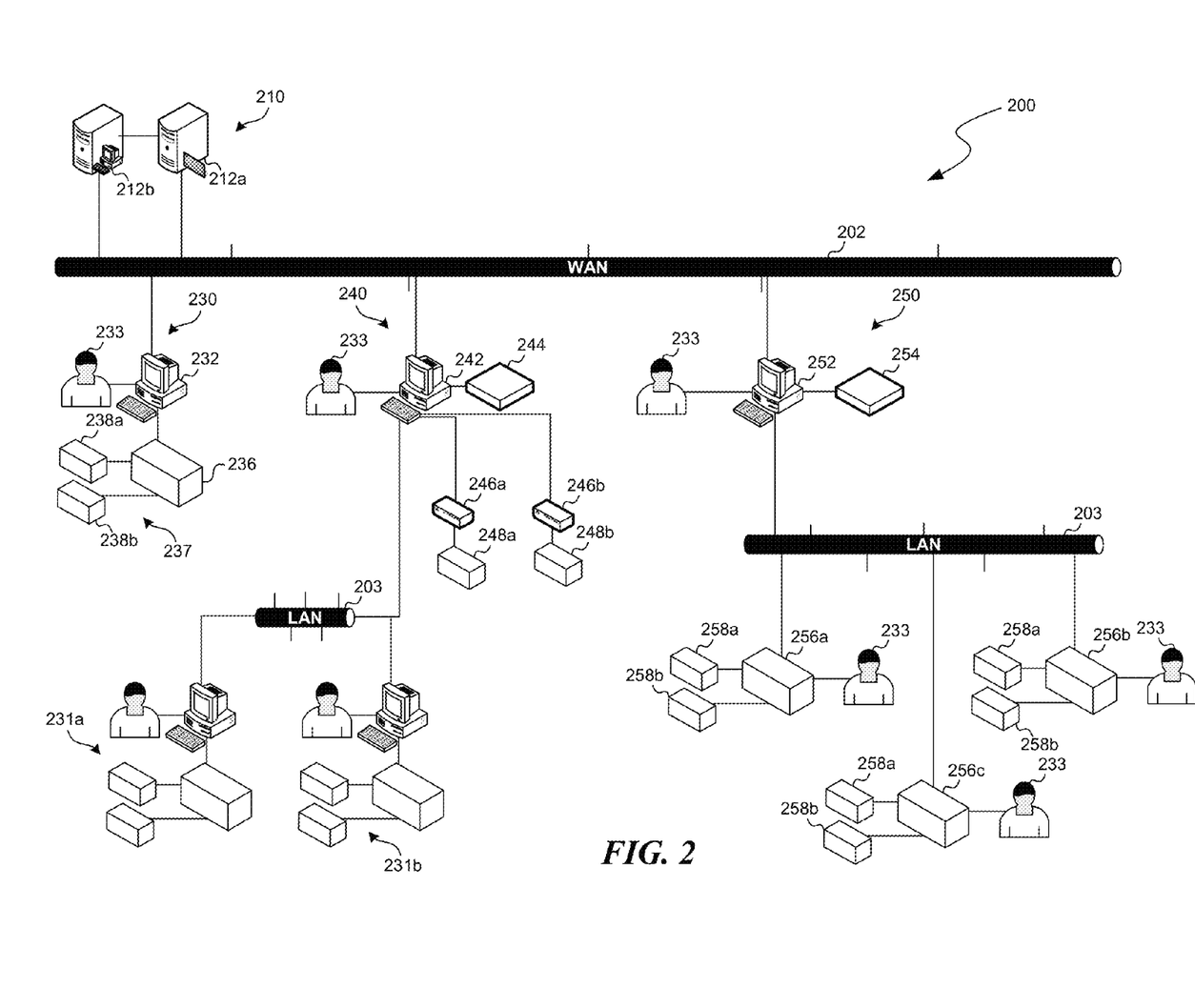

FIG. 2 is a schematic diagram of a suitable environment 200 illustrating communication and distribution of laser energy dispensed by laser energy sources associated with devices, such as laser processing systems. More specifically, the environment 200 includes a first facility 210 that can be generally similar to the facility 110 described above with reference to FIG. 1. In the embodiment illustrated in FIG. 2, the first facility 210 is associated with a laser energy provider and can include one or more servers 212 (identified individually as a first server 212a and a second server 212b). For example, the first server 212a can be a commerce server that creates, sells, and/or transfers laser energy credits via a network 202, such as the Internet. The second server 212b can be a cryptographic server that provides encryption and/or authentication for secure communication within the environment.

As further illustrated in FIG. 2, the facility 210 can receive requests for laser energy from one or more customers or consumers and can securely transmit corresponding laser energy credits to the consumers. For example, the environment 200 includes a first consumer 230, a second consumer 240, and a third consumer 250. Although first, second and third consumers 230, 240, 250 are illustrated in FIG. 2, one of ordinary skill in the art will appreciate that more or fewer than three consumers can participate in the environment 200, as well as combinations or sub-combinations of different consumers. The first consumer 230 includes a server or computing device 232 coupled to a processing system 237, such as a laser processing system. The laser processing system 237 includes a material processor 236, such as an engraver, and one or more laser sources or lasers 238 (identified individually as a first laser 238a and a second laser 238b) configured to emit a laser beam for processing target material. The first and second lasers 238a, 238b can be different lasers that can be interchangeable with the material processor 236. The computing device 232 and/or the laser processing system 237 can also be configured to be controlled via a user or technician 233. Although several features of embodiments of the present disclosure are described below with reference to the processing system 237 or the laser sources 238 (e.g., communication, distribution, control, etc.), one of ordinary skill in the art will appreciate that the features described herein are applicable to individual laser sources 238 as well as to their corresponding systems.

In certain embodiments, the laser processing system 237 can be directly sold to a consumer from a vendor. In such cases, the serial number or other identification of the laser 238 can be added to the consumer's device ownership list, which can be stored or registered with the facility 210. In other embodiments, however, the laser processing system 237 can be resold from one consumer to another consumer. In such cases, the registration or identification information corresponding to the laser processing system 237 can also be transferred to the subsequent purchasing consumer. In still further embodiments, a consumer can lease or sublease the laser processing system 237 with its corresponding identification or registration information.

According to certain aspects of the illustrated embodiment, the computing device 232 of the first consumer 230 can include instructions and communication protocols to act as an intermediary for requesting and/or transferring laser energy credits between the laser processing system 237 and the facility 210. Various models for requesting and/or transferring laser energy credits are described in detail below with reference to FIGS. 3A-5B.

As also shown in FIG. 2, the environment 200 can further include a second consumer 240 having a server or computing device 242 coupled to the network 202. The computing device 242 of the second consumer 240 is configured to communicate with multiple different processing systems or lasers. For example, the computing device 242 is coupled to an energy management dongle 244 that facilitates communication and handles the cryptographic communication between the computing device 242 and corresponding processing systems without exposing the corresponding processing systems to the network 202. More specifically, the computing device 242 can be coupled to another network 203, such as a local area network (LAN), to communicate with one or more second or dependent consumers 231 (identified individually as a first dependent consumer 231a and a second dependent consumer 231b). The dependent consumers 231 can have features generally similar to the first consumer 230 described above. For example, the dependent consumers 231 can each have a computing device that is coupled to the LAN 203, as well as corresponding laser material processing systems and laser sources.

The computing device 242 of the second consumer 240 can also be directly coupled to one or more laser processing systems 248 (identified individually as a first laser processing system 248a and a second laser processing system 248b)

via corresponding converters or bridges 246a (identified individually as a first bridge 246a and a second bridge 246b). In certain embodiments, the laser processing systems 248 connected directly to the computing device 242 of the second consumer 240 can be supplied from an original equipment manufacturer (OEM) and accordingly be configured to be used with corresponding OEM laser material processing systems.

According to additional features of the embodiment illustrated in FIG. 2, the environment 200 can also include a third consumer 250 having a corresponding server or computing device 252 coupled to the network 202. The computing device 252 of the third consumer 250 can also be coupled to another network 203, such as a local area network (LAN), to communicate directly with corresponding material processors 256 (identified individually as first through third material processors 256a-256c). Each material processor 256 can be compatible with one or more lasers 258 (identified individually as a corresponding first laser 258a and a corresponding second laser 258b) and/or controllable by corresponding users or technicians 233. As illustrated by the third consumer 250, the computing device 252 can request or purchase laser energy credits from the facility 210 independently of how the computing device 252 will distribute the laser energy credits to the corresponding lasers 258. In one embodiment, for example, the computing device 252 can distribute all, or a predetermined amount, of the laser energy credits to a specific laser 258. In other embodiments, however, the individual lasers 258 can access a pool of the available energy credits as required for processing. In still further embodiments, the computing device 252 can distribute the laser energy credits to a networked flexible processing system, such as the processing systems as disclosed in U.S. patent application Ser. No. 13/204,076, filed Aug. 5, 2011, and entitled "FLEXIBLE LASER MANUFACTURING SYSTEMS AND ASSOCIATED METHODS OF USE AND MANUFACTURE," which is incorporated herein by reference in its entirety.

The environment 200 described above with reference to FIG. 2 accordingly illustrates a secure commerce system including several subsystems and associated components for securely requesting, purchasing, distributing, and consuming measured amounts of laser energy or laser energy credits. For example, the environment 200 can enable the laser energy to be purchased only by authorized consumers or agents. The environment 200 can further distribute corresponding laser energy credits according to the cryptographically secure protocols in the environment 200.

Figure 3A:
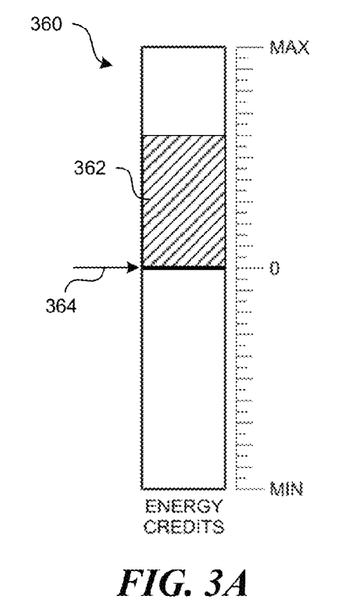

FIGS. 3A-5B are schematic illustrations representing several methods, policies, or models for requesting and dispensing laser energy credits. These models can be securely employed using the environments 100, 200 described above with reference to FIGS. 1 and 2. For example, FIGS. 3A-3D are schematic illustrations of a first model 360 for requesting and distributing laser energy credits. Referring to FIG. 3A, the first model 360 illustrates a scenario where a consumer can manually pre-pay for laser energy credits associated with a processing system, such as a laser processing system, to thereby render the processing system operational. More specifically, the first model 360 illustrates available laser energy credits 362 that can be loaded, transferred to, or otherwise associated with one or more laser processing systems in response to a consumer's request and before processing begins. The available laser energy credits 362 correspond to a predetermined amount of laser energy that can be emitted or dispensed by the laser processing system(s). The first model 360 also illustrates a processing cutoff 364 indicating when the available laser energy or laser energy credits 362 are fully dispensed (e.g., when zero energy credits 362 remain).

Figure 3B:
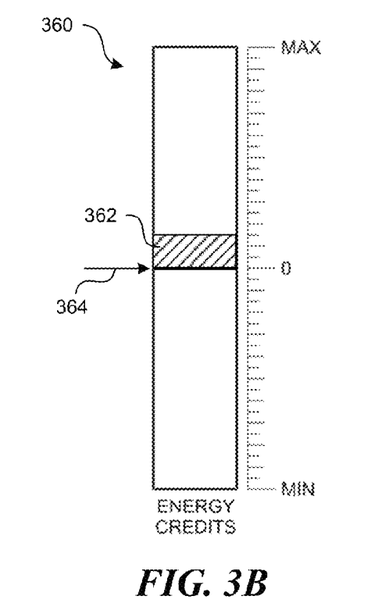

FIG. 3B illustrates the first model 360 during processing (e.g., laser firing) and in which the available laser energy credits 362 have been partially dispensed and are therefore approaching the processing cutoff 364. The amount of energy consumed by the corresponding laser processing system can be detected by various methods. One method, for example, can include diverting a small portion of the laser energy from the main laser beam using an optical splitter and directing that diverted energy into a detector. The detector can accordingly be calibrated to measure the amount of energy the laser is producing. Another method can include detecting the amount of electrical current drawn by the laser and correlating the electrical current to laser energy produced by the laser. Yet another method can include calculating the energy by multiplying the cumulative firing time of the laser by the laser's nominal output power rating, which can be expressed in Joules. For example, whenever the laser produces output power, the amount of energy dispensed or emitted is added to the cumulative total of emitted energy. The total emitted laser energy can then be subtracted from the available laser energy credits 362. In further embodiments, such laser processing systems can also calculate the amount of laser energy dispensed by tracking the cumulative time that the laser has been emitting laser energy, which can be expressed in seconds multiplied by the nominal or average power. For example, a 60 W laser that fires continuously for 10 seconds emits a nominal 600 J of laser energy, which dispenses a corresponding 600 J of available energy credits 362. Moreover, the tracked total emitted laser energy can accordingly be increased by the 600 J, and the 10 seconds can be added to the cumulative on-time of the laser. In still further embodiments, another method can include monitoring the control signal(s) used to activate and deactivate the laser in combination with the knowledge of the laser's rated power output to calculate the laser energy being emitted. In still further embodiments, a database of material settings corresponding to various materials and corresponding processing steps (e.g., cutting, marking, engraving, etc.) can be used to estimate the amount of laser energy that is needed prior to the processing.

Figure 3C:
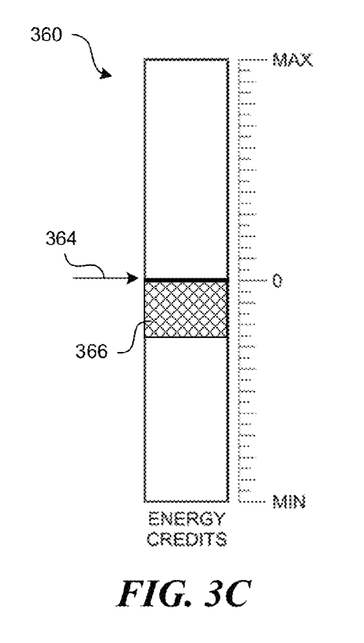

FIG. 3C illustrates the first model 360 during processing and in which the available laser energy credits 362 illustrated above in FIGS. 3A and 3B have been completely dispensed. According to aspects of the illustrated embodiment, the processing can continue and dispense a negative or deficit amount of laser energy credits 366 below the cutoff 364. In such embodiments, for example, the processing can be allowed to continue below the cutoff 364 to avoid prematurely stopping the processing in the middle of a processing run. As a result, the deficit amount of credits 366 represent the laser energy credits below the cutoff 364 that allow the processing system to complete a current processing run. In such cases, the laser processing system can accordingly be disabled following the completion of the current or latest processing run. In other embodiments, however, the laser processing system can be disabled when the available laser energy credits 362 reach the cutoff 364.

Figure 3D:
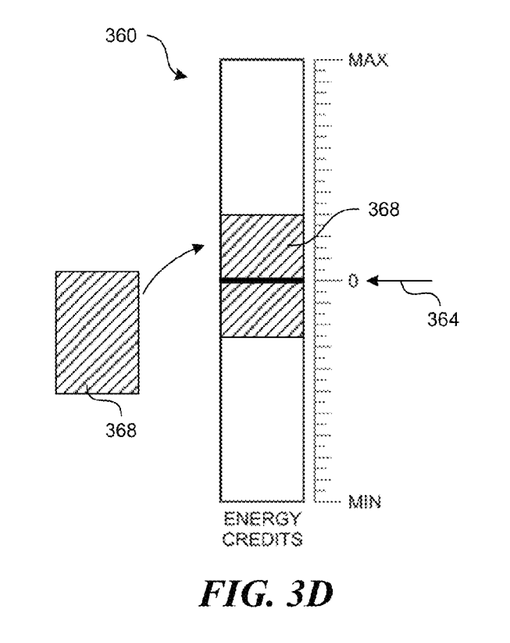

FIG. 3D illustrates the first model 360 during a transfer of new available laser energy credits 368 to the laser processing system. The new available laser energy credits 368 can be transferred in response to a purchase or request from the consumer or the laser processing system. The new available laser energy credits 368 correspond to an amount of laser energy that renders the laser processing system operational.

As shown in FIG. 3D, for example, the new available laser energy credits 368 can satisfy the deficit amount 366 from FIG. 3C and also provide for more available laser energy credits above the cutoff 364.

Figure 4A:
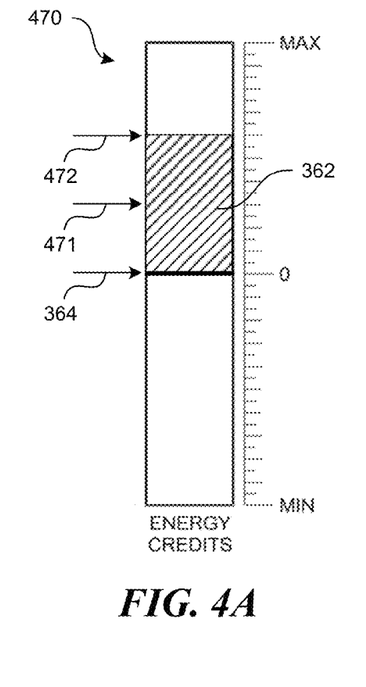

FIG. 4A illustrates a second model 470 in which a consumer can automatically pre-pay for laser energy credits associated with a processing system, such as a laser processing system. More specifically, as shown in FIG. 4A the second model 470 illustrates the available laser energy credits 362 that can be loaded or otherwise associated with the laser processing system before processing begins in response to a consumer's request. Similar to the first model 360 described above with reference to FIGS. 3A-3D, in the second model 470 the available laser energy credits 362 correspond to a predetermined amount of laser energy that can be dispensed by the laser processing system. The second model 470 also includes the processing cutoff 364 that indicates when the available laser energy credits 362 are fully dispensed (e.g., when zero laser energy credits 362 remain).

Figure 4B:
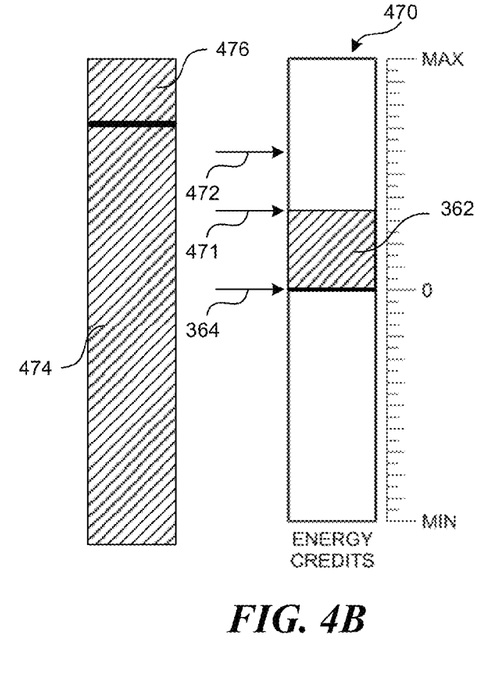
Figure 4C:
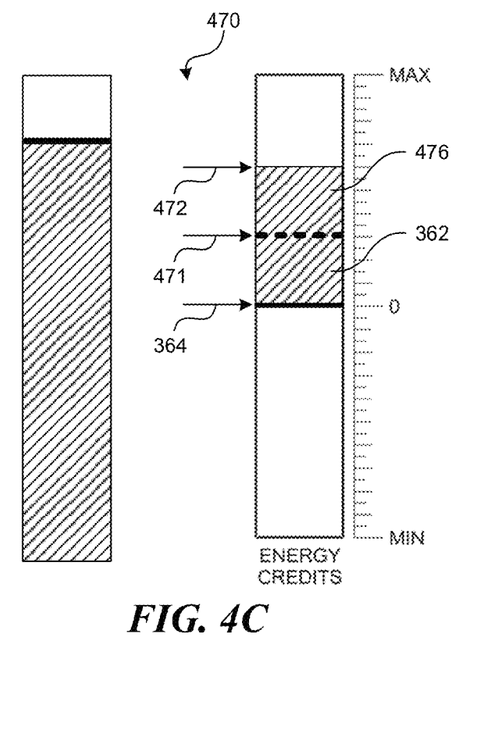

According to additional features of the embodiment illustrated in FIG. 4A, the second model 470 also includes a refill level 471 and a reserve level 472 of the laser energy credits. The refill level 471 represents a predetermined level or value of laser energy credits that automatically triggers a request for additional energy credits. For example, when the available laser energy credits 362 reach the refill level 471, the second model 470 can allow the consumer or the processing system to automatically request additional laser energy credits to at least the reserve level 472. More specifically, FIG. 4B illustrates the second model 470 during processing and in which the available laser energy credits 362 have been partially dispensed and reach the refill level 471. Upon reaching the refill level 471, the second model 470 can automatically request additional laser energy credits 476 to add to the available laser energy credits 362. In certain embodiments, the second model 470 can access or request the additional laser energy credits 476 from a laser energy credit pool 474. FIG. 4C illustrates the second model 470 when the additional laser energy credits 476 have been transferred from the laser energy credit pool 474 to be added to the available laser energy credits 362 to replenish the available laser energy credits 362 to the reserve level 472.

Figure 5A:
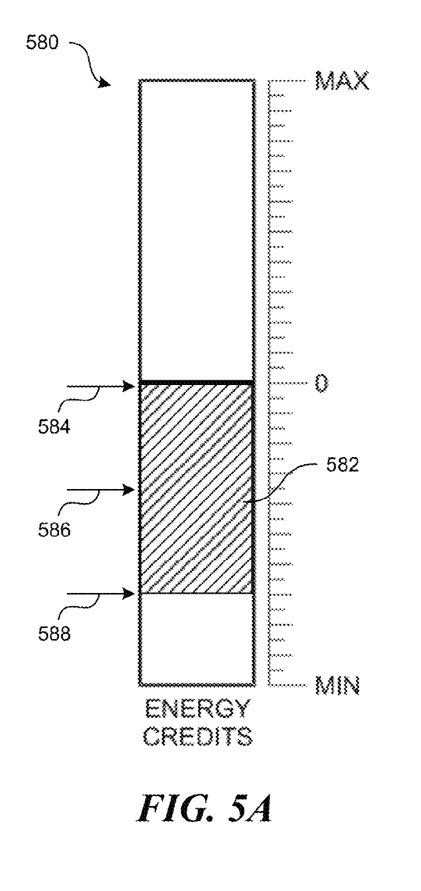

FIG. 5A illustrates a post-use payment third model 580 in which a consumer can pay for laser energy credits associated with a processing system (e.g., a laser processing system) after consuming the energy with the processing system. More specifically, as shown in FIG. 5A the third model 580 illustrates laser energy credits 582 represented below a reserve amount 584. The reserve amount 584 corresponds to zero laser energy credits. The third model 580 also illustrates a negative refill indicator or amount 586 and a processing cutoff 588. In contrast to the first model 360 and second model 470 described above with reference to FIGS. 3A-4C, the third model 580 allows a consumer to use or dispense laser energy credits 582 until the reaching the negative refill amount 586.

Figure 5B:
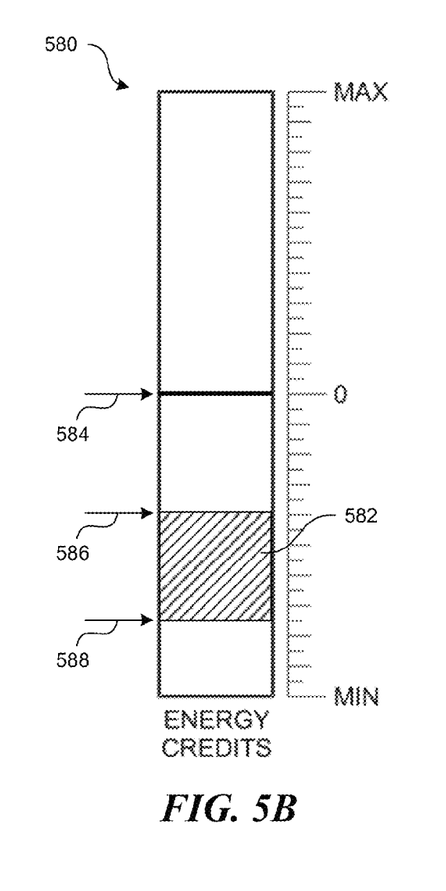

FIG. 5B illustrates the third model 580 after the laser energy credits 582 have been dispensed to the negative refill amount 586. At this point, the consumer or processing system can request additional credits, or the third model 580 can automatically request additional credits to replenish the laser energy credits to the zero reserve amount 584. If additional laser energy credits are not requested and the laser energy credits 582 are dispensed to the processing cutoff 588, the processing system can be disabled to prevent further processing. In certain embodiments, however, the processing can continue to at least complete the current processing run or batch.

Figure 6:
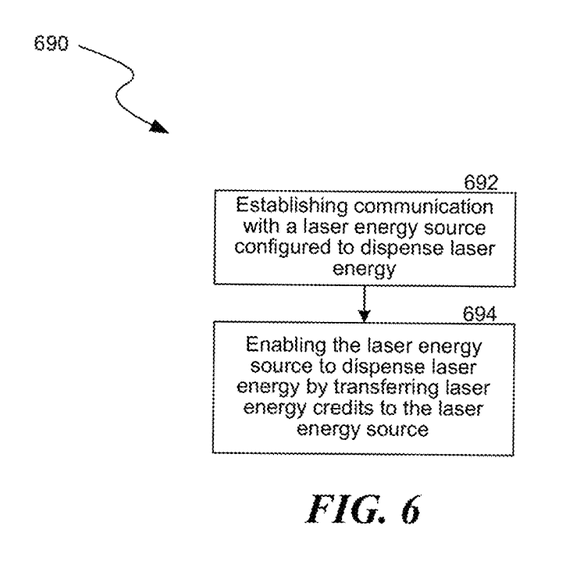
FIG. 6 is a flow diagram of a method of distributing laser energy credits in accordance with embodiments of the disclosure.

FIG. 6 is a flow diagram of a method 690 or process configured in accordance with embodiments of the disclosure for distributing laser energy to one or more processing systems (e.g., laser processing systems). The method 690 can be performed, for example by using any of the systems and associated components described above with reference to FIG. 1-5B. The method 690 includes establishing communication with a laser energy source configured to dispense laser energy (block 692). Communication with the laser energy source can be established and maintained according to any of the embodiments or models described above with reference to FIGS. 3A-5B and can include, for example, manual or automatic prepayment for the energy credits, as well as post use payment. The method 690 further includes enabling the laser energy source to dispense laser energy by transferring laser energy credits to the laser energy source (block 694).

From the foregoing it will be appreciated that specific embodiments of the disclosure have been described herein for purposes of illustration, but that various modifications may be made without deviating from the spirit and scope of the various embodiments of the disclosure. For example, although many features are described above with reference to specific or individual components that are illustrated schematically in the Figures, in other embodiments the system can include multiple components. Moreover, although several features are described above with reference to laser energy sources and laser processing systems, in other embodiments the individual components of these systems can have these features. More specifically, for example, although various features are described with reference to laser processing systems, in other embodiments individual laser energy sources can have or otherwise be associated with the corresponding features described with reference to the laser energy sources. Moreover, although laser processing systems are referenced throughout, one of ordinary skill in the art will appreciate that the laser energy can be used with other types of systems. Further, while various advantages associated with certain embodiments of the disclosure have been described above in the context of those embodiments, other embodiments may also exhibit such advantages, and not all embodiments need necessarily exhibit such advantages to fall within the scope of the disclosure.

We claim:

1. A method of distributing laser energy, the method comprising:
　　establishing communication with a laser energy source, wherein the laser energy source is configured to dispense laser energy to a material processor and to provide a laser beam for processing materials via the material processor;
　　enabling the laser energy source to dispense the laser energy by transferring laser energy credits to the laser energy source, wherein the laser energy credits correspond to an amount of dispensable laser energy, and wherein a user of the material processor is enabled to directly control a rate at which the laser energy source dispenses the laser energy to provide the laser beam; and
　　monitoring the laser energy dispensed by the laser energy source, wherein monitoring the laser energy includes using the laser energy source to monitor the laser energy it dispenses.

2. The method of claim 1 wherein transferring the laser energy credits includes transferring the laser energy credits from a server at a facility of a laser energy credit provider remote from the laser energy source.

3. The method of claim 1 wherein enabling the laser energy source to dispense laser energy includes enabling the user to select one or more laser sources from a plurality of laser sources each having a different rated power than the other.

4. The method of claim 1 wherein the laser energy source comprises a laser system.

5. The method of claim 1 wherein the laser energy source comprises a cluster of laser systems.

6. The method of claim 1 wherein enabling the laser energy source comprises transferring laser energy credits when the laser energy source dispenses laser energy to a predetermined refill threshold.

7. The method of claim 1 wherein the laser energy source includes an initial amount of laser energy credits, and wherein:
   enabling the laser energy source comprises transferring laser energy credits after the initial laser energy credits are at least partially dispensed; and
   transferring laser energy credits comprises transferring additional laser energy credits to the laser source, wherein the additional laser credits correspond to an amount of additional enabled laser energy.

8. The method of claim 7 wherein:
   enabling the laser energy source comprises transferring laser energy credits after the initial laser energy credits are consumed to a predetermined refill threshold; and
   transferring laser energy credits comprises automatically transferring the additional laser energy credits when the laser source consumes the initial laser energy credits to the predetermined refill threshold.

9. The method of claim 1 wherein the laser energy source does not include an initial amount of laser energy credits, and wherein:
   enabling the laser energy source comprises transferring laser energy credits after the laser source dispenses a predetermined amount of laser energy; and
   transferring laser energy credits comprises transferring additional laser energy credits to the laser source, wherein the additional laser credits correspond to an amount of additional enabled laser energy.

10. The method of claim 1 wherein the laser energy source is a first laser energy source, and wherein transferring laser energy credits comprises transferring laser energy credits from the first laser energy source to at least a second laser energy source.

11. The method of claim 10 wherein transferring the laser energy credits comprises transferring the laser energy credits to a computer that is coupled to at least one of the first and second laser energy sources, wherein the computer is configured to distribute the laser energy credits to the first and second laser energy sources.

12. The method of claim 1 wherein establishing communication with a laser source comprises establishing secure communication with the laser energy source including encrypted transfer of laser energy credits to the laser energy source.

13. The method of claim 1 wherein using the laser energy source to monitor the laser energy includes determining a total amount of dispensed laser energy based on a portion of the laser energy.

14. The method of claim 1 wherein using the laser energy source to monitor the laser energy includes:
   monitoring an electrical current drawn by the laser energy source; and
   determining a total amount of dispensed laser energy based on the electrical current.

15. The method of claim 1 wherein using the laser energy source to monitor the laser energy includes:
   measuring a cumulate amount of time that the laser energy source has emitted laser energy; and
   determining a total amount of dispensed laser energy based on the cumulative time and a nominal power of the laser energy source.

16. A method of distributing laser energy, the method comprising:
   establishing communication with a laser energy source, wherein the laser energy source is operably coupled to a material processor, and wherein the laser energy source is configured to provide a laser beam for processing materials via a material processor, wherein the material processor is configured to process the materials with the laser beam using laser energy dispensed from the laser energy source;
   enabling the laser energy source to dispense the laser energy to the material processor by transferring laser energy credits to the laser energy source, wherein the laser energy credits correspond to an amount of dispensable laser energy, and wherein a rate at which the laser energy is dispensed is directly controllable by a user of the material processor; and
   monitoring the laser energy dispensed to the material processor.

17. The method of claim 16 wherein monitoring the laser energy includes detecting that a total amount of laser energy dispensed to the material processor has fallen below a laser energy credit cutoff threshold below, and wherein the method further comprise disabling the laser energy source in response to detecting the laser energy credit cutoff threshold.

18. The method of claim 16 wherein monitoring the laser energy includes using the laser source to monitor at least one of:
   a portion of dispensed laser energy, wherein the dispensed portion of laser energy is related to a total amount of dispensed laser energy;
   electrical current, wherein the electrical current corresponds to an amount of dispensed laser energy; and
   the cumulative time of emission of laser energy multiplied by nominal power of the laser energy source.

19. The method of claim 18, furthering comprising correlating at least one of the portion of dispensed laser energy, electrical current, and/or sum of individual dispensed laser energy pulses to determine a corresponding amount of consumed laser energy credits.

20. The method of claim 16 wherein the rate at which the laser energy is dispensed is based at least in part on a cumulative on time of the laser source multiplied by a nominal output power rating of the laser source.

21. The method of claim 16 wherein the rate at which the laser energy is dispensed is based at least in part on a cumulative on time of the laser source.

22. The method of claim 16 wherein enabling the laser energy source to dispense the laser energy includes enabling the user to select one or more laser sources for dispensing the laser energy from a plurality of laser sources each having a different rated power.

* * * * *